Nov. 20, 1923.
F. W. GRIES ET AL
1,475,111
ACCELERATOR
Filed March 31, 1922
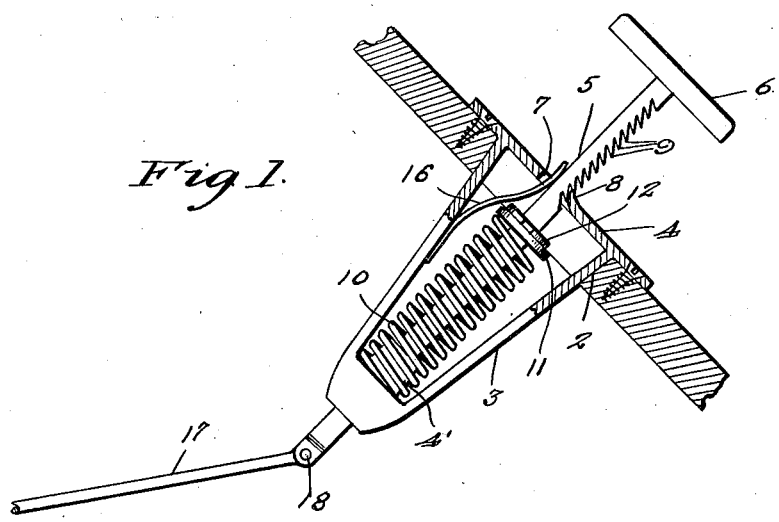
Fig 1.
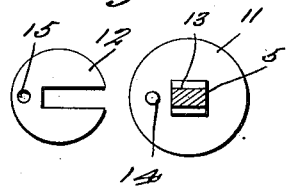
Fig. 3.
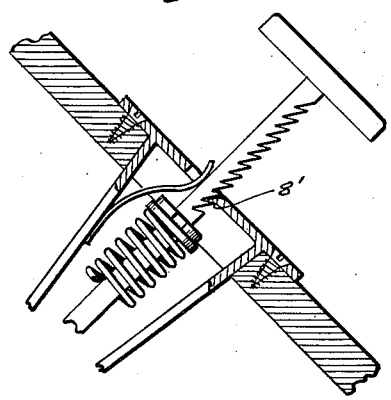
Fig. 4.
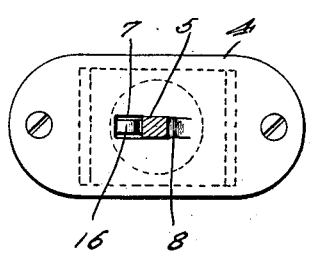
F. W. Gries
A. L. Gries
INVENTOR
BY Victor J. Evans
ATTORNEY
R. Q. Thomas
WITNESSES Patented Nov. 20, 1923.

1,475,111

UNITED STATES PATENT OFFICE.

FREDERICK W. GRIES AND AUGUST L. GRIES, OF WATERVLIET, NEW YORK.

ACCELERATOR.

Application filed March 31, 1922. Serial No. 548,433.

*To all whom it may concern:*

Be it known that we, FREDERICK W. GRIES and AUGUST L. GRIES, citizens of the United States, residing at Watervliet, in the county of Albany and State of New York, have invented new and useful Improvements in Accelerators, of which the following is a specification.

This invention relates to an improved accelerator pedal for motor vehicles, the principal object of the invention being to provide means for holding the pedal in adjusted position so that it will not vibrate when the automobile is passing over rough roads and thus secure an even flow of gas from the engine.

Another object of the invention is to so place the parts forming the invention that the pedal can be manipulated by the foot without interference from said parts.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a sectional detail view of one form of the invention.

Figure 2 is a plan view of Figure 1 with the top of the pedal broken away.

Figure 3 is a detail view of the means for supporting the collars which engage the top of the spring.

Figure 4 is a view of a modification.

In these views 1 indicates a portion of the floor board of the automobile which is provided with an opening 2 and 3 indicates a substantially V-shaped bracket passing through said opening and having its top plate 4 suitably secured to the floor board. The lower part of the bracket is formed with a bushing plate 4' through which passes the stem 5 of the pedal, the head of the pedal being shown at 6. The stem passes through an opening 7 formed in the plate 4 and at one side of said opening the plate is provided with an upwardly curved lip 8 for engaging the downwardly inclined teeth 9 formed on the front edge of the stem. A coiled spring 10 surrounds the stem and has one end bearing against the bushing and its other end bearing against the collar 11 which is held in a certain position on the stem by means of the notched collar 12 which engages the reduced part 13 of the stem. The two collars are locked together by a pin 14 and collar 11 engaging a hole 15 in collar 12. Thus the collar 12 has its notch held in engagement with the shoulder formed by the reduced part 13 of the stem so that the collars cannot move longitudinally on the stem. A leaf spring 16 has one end secured to the bracket 3 and its other end engages the stem and tends to force the teeth in engagement with the lip. The bottom of the stem is connected with the carbureter rod 17 by the pivot pin 18.

When the speed of the motor is to be accelerated the pedal is first pressed away from the lip so as to free said lip from the teeth and against the action of spring 16 so as to free the teeth from the lip to permit the pedal to be depressed against the action of spring 10. After the pedal has been depressed sufficiently to secure the proper speed desired the lateral pressure is removed so as to permit the spring 16 to force the teeth on the stem against the lip, the downward pressure of the foot preventing the spring 10 from forcing the pedal upwardly. Thus the lip and teeth will provide a rest for the pedal and prevent it from being forced downwardly so that the pedal will act as a foot rest and it will be prevented from vibrating as the car passes over rough stretches of road.

In the modification shown in Figure 4 the teeth of the pedal are reversely arranged with respect to those shown in the first form of the invention and the lip 8' is inclined downwardly so as to lock the pedal in its lowered position. In this form of the invention the foot can be removed from the pedal and it will remain in adjusted position.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

An accelerator of the character described comprising a substantially V-shaped supported bracket, a top plate bridging the arms of the bracket and being provided with an opening centrally disposed therethrough, a bushing plate formed on the lower end of the bracket, a headed stem passing through the plates for a slidable movement and being provided with a plurality of notches arranged adjacent its upper end, means extending in the opening on the top plate and arranged in the path of the notches for operative engagement therewith, a pair of pivotally associated collars arranged in superimposed relation, one of said collars being notched and received in a reduced portion of the stem, and a coil spring surrounding the stem and having its end convolutions engaging the adjacent collar and the bushing plate respectively for the purpose specified.

In testimony whereof we affix our signatures.

FREDERICK W. GRIES.
AUGUST L. GRIES.